Jan. 5, 1954

L. W. IMM 2,665,069

EQUATION SOLVING MECHANISM

Filed May 7, 1947

INVENTOR.
Lewis W. Imm
BY
Naylor and Lanegre
ATTORNEYS

Jan. 5, 1954            L. W. IMM            2,665,069

EQUATION SOLVING MECHANISM

Filed May 7, 1947            8 Sheets-Sheet 2

INVENTOR.
Lewis W. Imm
BY Naylor and Lasagne
ATTORNEYS

Jan. 5, 1954

L. W. IMM

2,665,069

EQUATION SOLVING MECHANISM

Filed May 7, 1947

INVENTOR.

Lewis W. Imm
BY
Naylor and Lassogne
ATTORNEYS

Jan. 5, 1954  L. W. IMM  2,665,069
EQUATION SOLVING MECHANISM
Filed May 7, 1947  8 Sheets-Sheet 4

INVENTOR.
Lewis W. Imm
BY Naylor and Lassagne
ATTORNEYS

Jan. 5, 1954  L. W. IMM  2,665,069
EQUATION SOLVING MECHANISM
Filed May 7, 1947  8 Sheets-Sheet 5

INVENTOR.
Lewis W. Imm
BY
ATTORNEYS

FIG_18_

FIG_19_

FIG_17_

INVENTOR.
Lewis W. Imm
BY Naylor and Lamesque
ATTORNEYS

Jan. 5, 1954  L. W. IMM  2,665,069
EQUATION SOLVING MECHANISM
Filed May 7, 1947  8 Sheets-Sheet 7

INVENTOR.
Lewis W. Imm
BY Naylor and Lavagne
ATTORNEYS

Jan. 5, 1954 L. W. IMM 2,665,069
EQUATION SOLVING MECHANISM
Filed May 7, 1947 8 Sheets-Sheet 8

INVENTOR.
Lewis W. Imm
BY Naylor and Lassagne
ATTORNEYS

Patented Jan. 5, 1954

2,665,069

UNITED STATES PATENT OFFICE 2,665,069

EQUATION SOLVING MECHANISM

Lewis W. Imm, Pacoima, Calif., assignor to Librascope, Incorporated, Burbank, Calif., a corporation of California Application May 7, 1947, Serial No. 746,512

8 Claims. (Cl. 235—61)

The present invention relates to improvements in mechanisms for solving equations of the type in which the solutions, graphically represented, approach a limit value or values by progressively decreasing increments. Examples of such curves are parabolic curves, which approach a single limit value by such progressively decreasing increments; sinusoidal curves, which similarly approach two opposite limits; and curves which approach their limits as an asymptote, but theoretically do not ever quite reach such limits. Such mechanisms include, but are not limited to, devices for extracting exponential roots and devices for converting a function of an angle into an angular value, as well as devices for solving more complex equations.

Previously known mechanical devices for the solution of such equations by the transmission of proportional movements from input to output elements of the computer have been either inaccurate or inoperative in that part of their range in which the output value is approaching its limit, and have been wholly incapable of passing through a limit value to register a negative output value. This is true because, as the output value approaches a limit value, the mechanical disadvantage encountered in driving the output registering device becomes progressively greater; theoretically becoming infinite when the output value coincides with the limit value. As a practical matter, however, the mechanical disadvantage becomes insurmountable somewhat before the limit value is reached, because of the friction inherent in any mechanical system.

It is the principal object of the present invention to extend the range of calculation of mechanisms of the general class above described.

It is a further and more specific object of the present invention to make possible the extension of the range of calculation of such mechanisms to and beyond limit values, so that negative output values may be obtained.

The foregoing, together with additional objects and advantages which will be apparent, are attained by the application of a new principle according to which the output element of a computing mechanism of the type described, instead of being driven by mechanical power from the input element transmitted through the computing mechanism, is driven by a separate source of mechanical power, transmitted reversely through the computing mechanism and controlled by the input element so that the extent of the movement so imparted to the computing mechanism matches the extent of the movement which should, but cannot under the circumstances outlined above, be imparted to it by the input element.

The best mode in which the application of this principle has been contemplated is described in the following specification disclosing preferred embodiments of the invention adapted for the solution of various exemplary equations; reference being had to the accompanying drawings, in which.

First, the invention will be described as it is preferably embodied in a right triangle solving mechanism in which extraction of a square root is necessary to ascertain the length of the hypotenuse when the lengths of the two sides are known.

In the embodiment first described, values proportionate to the known lengths of the sides of the triangle are squared by function computing mechanisms of the form described and claimed in my copending application Serial Number 508,231, filed October 29, 1943, now Patent No. 2,485,200, granted October 18, 1949, although, as hereinafter explained, the present invention is not limited in its application to function computing mechanisms of that form. The outputs of the two function computing mechanisms are then combined by differential gearing to give an output equal to the sum of the squares of the lengths of the known sides and equal to the square of the length of the hypotenuse.

The length of the hypotenuse is then ascertained by extracting the square root of this value; but the power required to drive the square root extracting mechanism, instead of being furnished through the above mentioned squaring mechanisms and differential gearing, is supplied by a separate servomotor. This motor power is applied at the output, indicating or root side of the square root extracting mechanism. The motor thus turns the input or squared value shaft of the square root extracting mechanism the power being transmitted to it from the output or root value shaft side. By disposing the control of the servo-motor between the differential gearing output shaft and the input shaft of the square root extracting mechanism, the rotation of these shafts is matched, thus insuring that the servomotor moves the square root extracting mechanism to match the extent of movement which should be imparted to it by the differential gearing output shaft. Throughout this specification, unless specifically defined otherwise, the terms "input" and "output" have been used in a sense to indicate the data-transmitting direction of operations. This does not coincide in all parts of the structure with the direction in which power to operate the mechanism is being supplied. In the portion for extracting the value of $c$, for example, the driving power is inserted on the answer or output side, and fed back to drive the $c^2$ elements into matching position with the $a^2+b^2$ elements. Thus the data-transmission sequence is from the $a$ and $b$ values to $a^2$ and $b^2$ values, thence to $a^2$ plus $b^2$ values (equal to $c^2$), thence finally to the $c$ value: while there are two power-transmission sequences, one from $a$ and $b$ to $a^2$ and $b^2$, thence to $a^2+b^2$; and the other from $c$ to $c^2$.

Under these conditions, the output of the square root extracting mechanism will accurately represent the length of the hypotenuse, down to and including a zero value thereof; a range of computation impossible with previous devices because of the mechanical disadvantage encountered in attempting to drive any square root extracting mechanism down to any close approach to a zero root value.

Referring specifically to the accompanying drawings, illustrating this embodiment, the parts of the machine are on a front plate 1 and a rear plate 2 which are connected by spacing and tie members 3.

Considering that we have a right triangle having an altitude $a$, a base $b$ and a hypotenuse $c$, the values of $a$ and $b$ may be entered into the machine by rotating the input knobs 4 and 5, respectively. The knob 4 is secured to an input shaft 6 to which is secured a dial 7 having calibrations adapted to be read relative to a reference point 8. Also secured to the shaft 6 is a gear 9, a pinion 10 and a cone 11. The pinion 10 drives a gear 12 secured to a shaft 13 to which is also secured pinion 14 which drives a gear 15 secured to a shaft 16 to which is secured a dial 17 having calibrations thereon adapted to be read relative to a reference point 18.

In like manner the input knob 5 is secured to a shaft 19 to which is secured a disk 20 having reference characters thereon adapted to be read relative to a reference point 21. Also secured to the shaft 19 is a pinion 22, a gear 23 and a cone 24. The pinion 22 drives a gear 25 secured to a shaft 26 which carries a pinion 27 which drives a gear 28 secured to a shaft 29, to which is secured a disk 30 having calibrations thereon adapted to be read relative to a reference point 31.

The gear 9 drives a gear 32 rotatably mounted on a shaft 33. The gear 32 serves as one input for a differential mechanism to be presently described.

Figure 8:
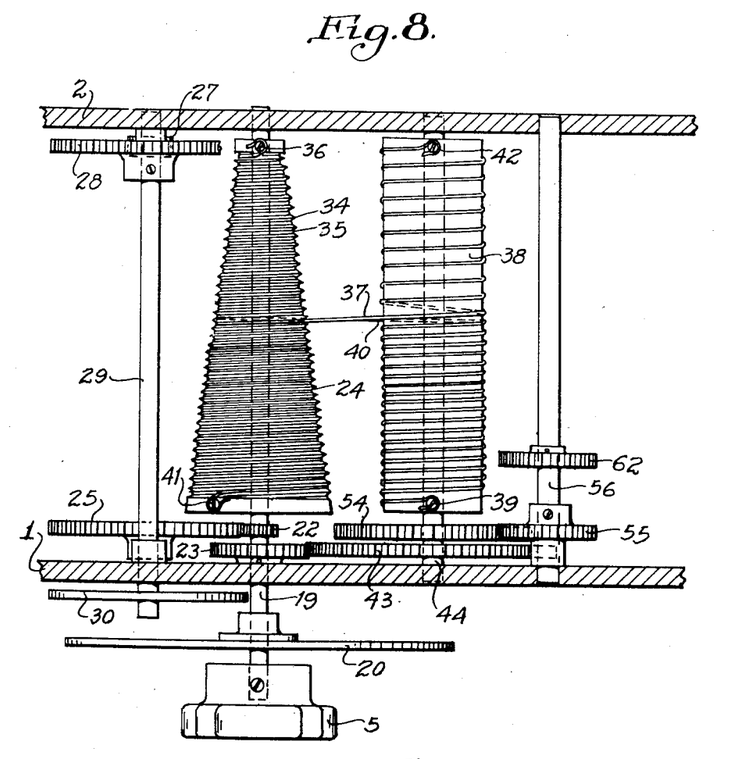
Figure 8 is a plan view taken on substantially the line 8—8 of Figure 2.

As fully explained in my copending application, Serial No. 508,231, previously referred to, now U. S. Patent No. 2,485,200, I have provided a cone, cylinder and differential mechanism whereby a number may be squared. In Figure 8 I have shown such a squaring mechanism which is the squaring mechanism to square the leg $b$ of the triangle. The cone 24 is provided with two helical threads 34 and 35 each forming an Archimedean spiral and extending throughout the length of the cone. This cone does not extend to a point, and a typical example of the type of cone employed would be one having a small radius of .2″, the radius of its large end being .8″ so that its average radius is .5″ so that the increase in radius per turn of the cone would be .015″ if there were 40 convolutions of each of the threads 34 and 35. Attached to the small end of the cone at the point 36 is a cable 37 which is wound around the thread 34 and passes from the cone to a cylinder 38 on to which it is wound and its other end is attached to the point 39 of the said cylinder. A second cable 40 is secured to the cone at its large end at the point 41 and is wound around the thread 35 to where it passes from the cone to the said cylinder 38 to which it is attached at a point 42.

The gear 23 drives a gear 43 forming a part of a differential mechanism. The gear 43 is loosely mounted on the shaft 44, on which the cylinder is mounted. The differential mechanism may be better understood by referring to Figures 9 to 15 inclusive. The cylinder 38 is secured to a pinion 45 and drives pinions 46 mounted on arbors 47 carried by arms 48 of a spider 49. The pinions 46 mesh with and drive pinions 50 mounted on arbors 51 carried by arms 52 of the spider. The pinions 50 mesh with a pinion 53 secured to the gear 43. An output gear 54 is secured to the spider 49 by any suitable means such as being pressed thereon. A cover 49a is secured to cylinder 38 to protect a portion of this gearing.

If the cone tapered to a zero point the differential mechanism would not be necessary, but it is not practical to use a cone tapered to a zero point in the machine. The net result of this differential mechanism is to transfer the zero point of the theoretical cone to a given point on the actual cone such as the small end thereof. As fully explained in my said copending application, this is accomplished by providing the differential mechanism and provided the diameter of the zero point selected for the cone, such as its small end, is to the diameter of the cylinder as the ratio between the gears 23 and 43. This may be further explained as follows:

If the cone had a small radius of .2", a large radius of .3" and if the radius of the cylinder is .5" and if the pinion 23 has 48 teeth and the gear 43 has 120 teeth so that the small radius of the cone is to the radius of the cylinder as 1 is to 2½ and the gear ratio between the gears 23 and 43 is as 1 is to 2½, and if the increase in radius per turn of the cone is .015", and if the output gear 54 has 96 teeth and drives a gear 55 of 48 teeth, the following computation is correct:

| No. of turns of cone | Mean diam. of cone 24 | No. of revol. of 1" dia. cylinder 38 | No. of revol. subtracted by differential | No. of revol. of output gear 55 and shaft 56 |
|---|---|---|---|---|
| 1 | .415 | .415 | .4 | .015 |
| 2 | .445 | .860 | .8 | .060 |
| 3 | .475 | 1.335 | 1.2 | .135 |
| 4 | .505 | 1.840 | 1.6 | .240 |
| 5 | .535 | 2.375 | 2.0 | .375 |
| 6 | .565 | 2.940 | 2.4 | .540 |
| 7 | .595 | 3.535 | 2.8 | .735 |
| 8 | .625 | 4.160 | 3.2 | .960 |
| 9 | .655 | 4.815 | 3.6 | 1.215 |
| 10 | .685 | 5.500 | 4.0 | 1.500 |

It will be noted from the above tabulations that the shaft 56 is rotated proportional to the square of the number of rotations of the cone. The gear 62 is secured to the shaft 56 and drives a differential gear 63.

The squaring mechanism for the input for the leg $a$ may be identical to that described above for the input value $b$. However, there may be cases in which the leg $a$ representing the altitude of the triangle may be considerably shorter than the leg $b$ representing the base. Suppose, for instance, the limit of the altitude should be found never to exceed ½ of the length of the base. We might then employ the entire cone 11 to enter only ½ as much value as the cone 24, and yet we desire to use the entire cone 11 to enter this maximum value 20. This could be done by providing a suitable reduction gearing.

The cone 11 drives a cylinder 57 in precisely the same manner as the cone 24 drives the cylinder 38. There is also provided a differential mechanism identical with that heretofore described and interposed between the cylinder 57 and the gear 32 which drives an output gear 58 for the differential. This gear 58 drives a gear 59 secured to a shaft 60 to which is secured a pinion 61 which drives a differential gear 64.

It is therefore apparent that the differential gear 63 is driven an amount proportional to the square of the value entered for the leg $b$ while the differential gear 64 is driven an amount proportional to the square of the value entered for the leg $a$.

Figure 16:
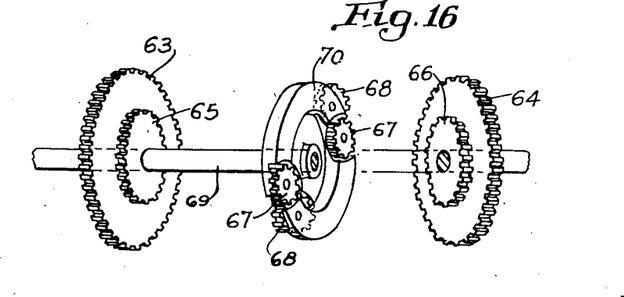
Figure 16 is an exploded view of a second type of differential mechanism.

The differential mechanism shown in Figure 16 adds $a^2+b^2$. The gear 63 has secured thereto a pinion 65 while the gear 64 has secured thereto a pinion 66. The pinion 65 meshes with and drives pinions 68 carried by the differential spider 70 which is secured to the output shaft 69. The pinion 66 meshes with and drives pinions 67 carried by the differential spider 70. Each of the pinions 67 meshes with its respective pinions 68 but they are slightly offset so that the pinions 67 do not mesh with the pinion 65 but are driven only by the pinion 66 while the pinions 68 do not mesh with the pinion 66 but are driven by the pinion 65. It is therefore obvious that the output shaft 69 will be driven an amount proportional to $a^2+b^2$. The shaft 69 has secured thereto an arm 71 having a contact 72 mounted thereon. The arm 71 will therefore move an amount proportional to $a^2+b^2$.

The calculating mechanism for computing the value of the hypotenuse $c$ from the square of that value is identical in construction to that heretofore described in connection with the calculation of the values for $a$ and $b$ and squaring the same, but is operated to find the square root instead of the square of an input value, and the driving power is fed through the mechanism from the solution or output side instead of from the data or input side. A servomotor 73 drives a gear 74 mounted on the rear wall of the machine on a shaft 75 to which is attached a cone 76, a pinion 77, a gear 78 and a disk 79 having calibrations thereon adapted to be read relative to a reference point 80. The pinion 77 drives a gear 81 secured to a shaft 82 to which is attached a pinion 83 which drives a gear 84 secured to a shaft 85, to which is attached a dial 86 adapted to be read relative to a reference point 87.

Figure 9:
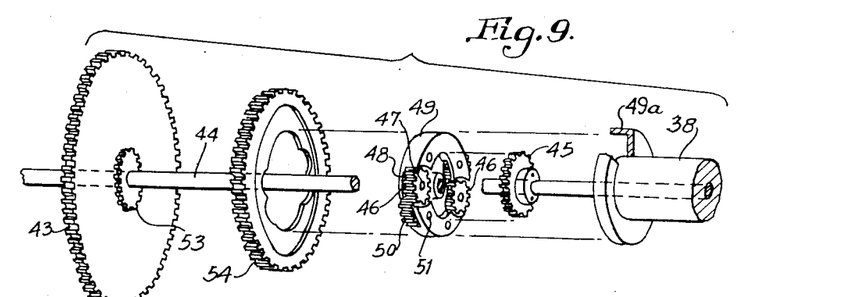
Figure 9 is an exploded view of one of the differential mechanisms employed.
Figure 10:
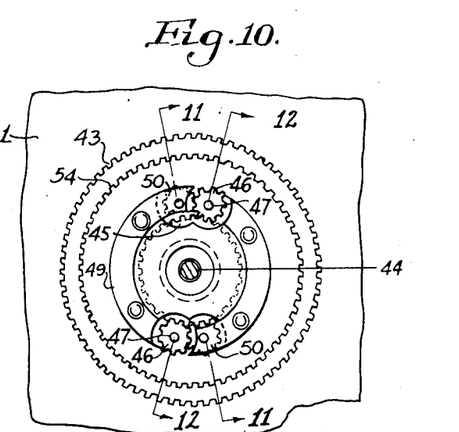
Figure 10 is a face view of the differential mechanism shown in Figure 9 and taken on substantially the line 10—10 of Figure 11.
Figure 11:
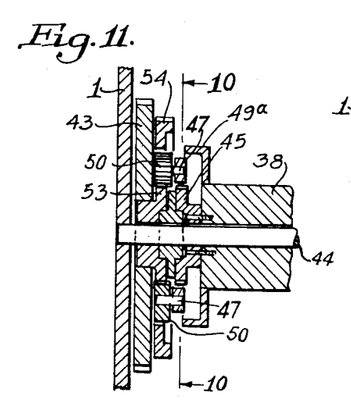
Figure 11 is a cross sectional view taken on substantially the line 11—11 of Figure 10.
Figure 12:
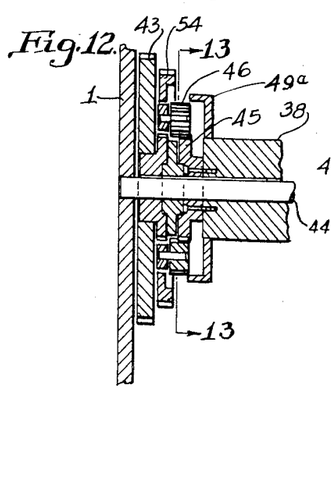
Figure 12 is a similar cross sectional view taken on the line 12—12 of Figure 10.
Figures 13, 14, 15:
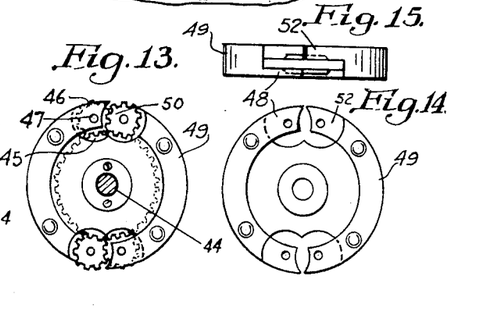
Figure 13 is a side elevational view partly in cross section taken on substantially the line 13—13 of Figure 12.
Figure 14 is a face view of the spider shown in Figure 13.
Figure 15 is a top plan view of the spider shown in Figure 14.

The cone 76 is identical to the cones heretofore described and drives a cylinder 88 in identically the same manner as heretofore described in connection with the cylinders 38 and 57. The gear 78 drives a gear 89 which performs exactly the same function as the gear 43. A differential mechanism identical to that shown in Figure 9 is interposed between the cylinder 88 and the gear 89 and has a gear 90 identical to the output gear 54. This gear 90 drives a gear 91 secured to a shaft 92 which extends through to the rear wall of the machine and has secured thereto a pinion 93 which drives a gear 94, which is coaxial with the shaft 69 and is rotatably mounted thereon. Secured to the gear 94 is an arm 95 and a contact 96 near the outer end thereof. It is obvious that the gear 94 and the arm 95 are rotated an amount corresponding to $c^2$. The arms 71 and 95 are initially set so that when $a^2+b^2=c^2$ the said contacts 72 and 96 will touch each other.

The arm 71 is insulated from the shaft 69 but the arm 95 is not insulated. An arm 97 is secured to a stud 98 and carries an arm 99 insulated from the arm 97 by insulation 100. An electrical lead 101 extends to the arm 99 which bears against the insulated arm 71 near its center point. Therefore, when the contacts 72 and 96 are closed, the circuit is completed from the lead 101 through the arm 99, arm 71, contacts 72 and 96 and arm 95, to the framework of the machine to which is attached a return lead 102 thereby completing a circuit. The leads 101 and 102 control the servo-motor so that when the circuit is closed by the contacts 72 and 96 touching each other, the motor operates in one direction, and when they are separated the motor operates in the opposite direction. Many such motors and motor controls are well known; an example of a standard and well known type being diagrammatically illustrated together with its control circuit, including the leads 101 and 102, in Figure 17 to a conventional power source, not shown in the drawing. In this type of control, the motor normally runs in one direction, but closure of the contacts 72 and 96, by applying a resistance shunt across a condenser in series with one field winding of the motor 73, changes the phase relationship to an extent sufficient to cause the motor to run in the opposite direction. The details of the motor and its control circuit form no part of the present invention, and any reversible motor similarly controlled through a reversing relay or otherwise can be as readily utilized.

The provision of a reversible servomotor of either the type just described or the type described in connection with the embodiment shown in Figure 22 makes possible the continuous indication of a result during changes of any input value or values, regardless of whether such input value or values is increasing or decreasing.

Figure 1:
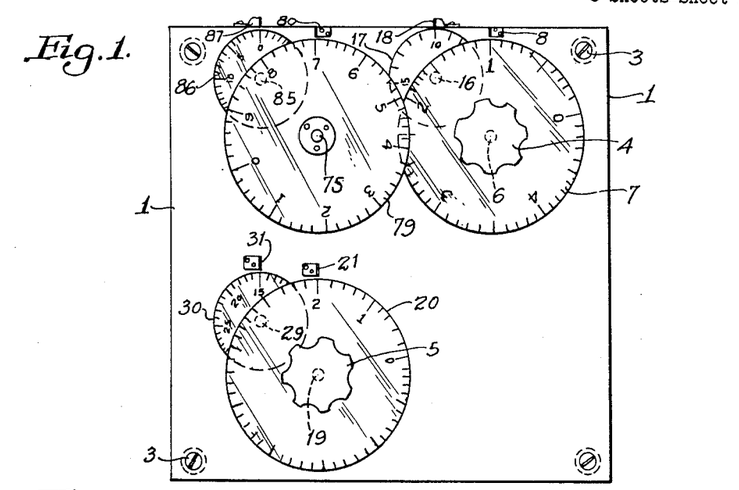
Figure 1 is a front elevational view of the machine.
Figure 2:
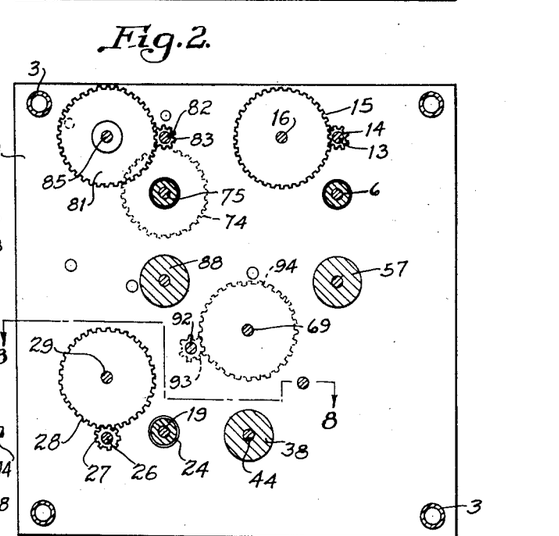
Figure 2 is a cross sectional view taken on the line 2—2 of Figure 3 and looking towards the rear of the machine.
Figure 3:
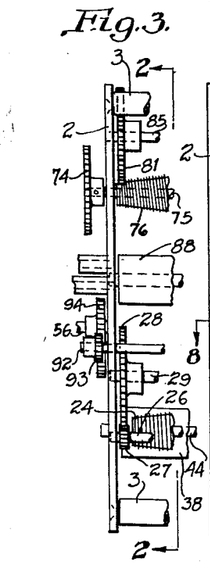
Figure 3 is an elevational view looking from the left to the right of Figure 2 and at right angles thereto.
Figures 4, 5:
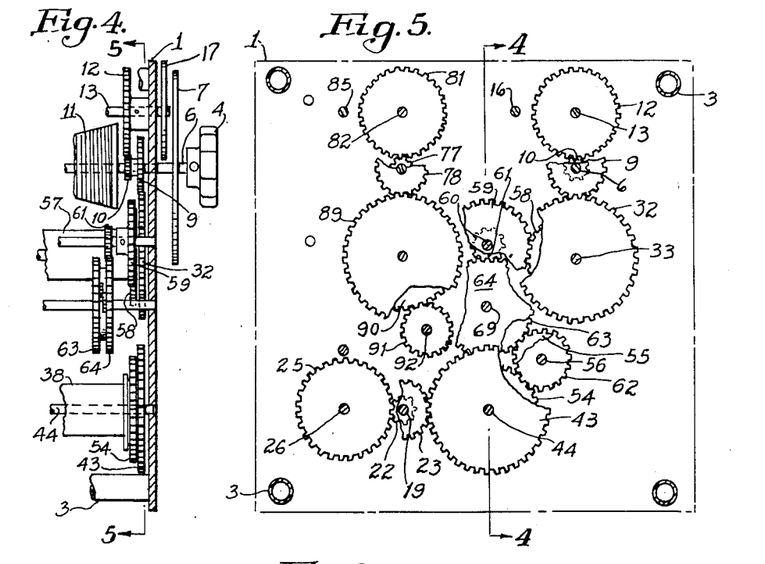
Figure 4 is an elevational view, partly in cross section, on the line 4—4 of Figure 5.
Figure 5 is an elevational view partly in cross section, showing the front plate of the machine and certain of the parts mounted thereon taken substantially on the line 5—5 of Figure 4.
Figure 6:
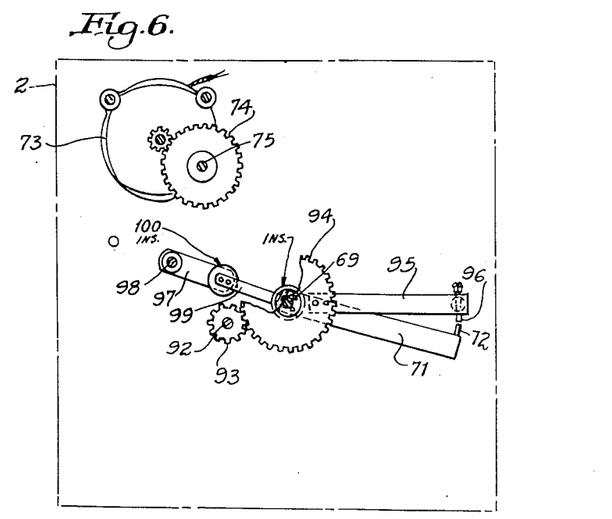
Figure 6 is a view looking toward the rear from the rear plate to show certain of the parts mounted thereon.

The net result is that when the motor has rotated the arm 95 an amount equal to the rotation of the arm 71, the circuit is closed and the indicators 79 and 86 now represent the value of $c$ for the reason that in the right triangle $c^2$ equals $a^2+b^2$ and the arm 71 has been rotated in an amount to represent $a^2+b^2$ and the arm 95 has been rotated in the amount to represent $c^2$. As soon, however, as the contacts 72 and 96 are closed, the motor is reversed with the result that the arm 95 starts to move so as to break the said contacts 72 and 96 but instantly the motor is now reversed again bringing the contacts together again. This back and forth movement of the arm 95 is exceedingly small and in fact, so small as to be negligible, so that we can consider that the indicators representing the $c$ value remain stationary unless the value of $a$ or $b$ should be changed. If either of them were changed so as to move the arm 71 clockwise as viewed in Figure 6, the arm 95 would follow it and if the arm 71 were moved anti-clockwise the arm 95 would back away from it—not by the arm 71 pushing the arm 95, but because through the control mechanism the arm 95 is constantly being moved slightly away from and then towards the arm 71.

Figure 7:
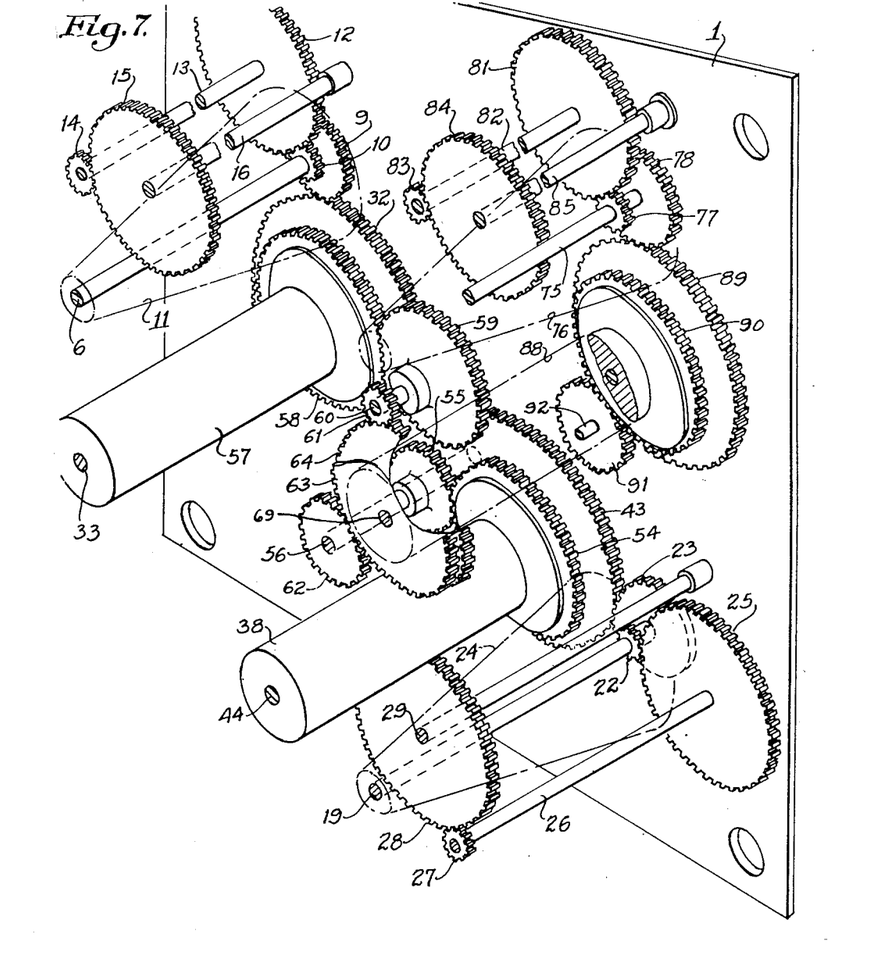
Figure 7 is a perspective view looking toward the front wall of the machine and with the rear wall removed so that the parts may be more clearly seen.

We have heretofore considered that the two legs $a$ and $b$ were known, and the hypotenuse $c$ was to be determined from the equation $a^2+b^2=c^2$. If the hypotenuse and one leg are known, and if it is desired to calculate the value of the other leg, we can call the input knob 4, the hypotenuse knob, and the input knob 5 the knob of the known leg. The expression would now become $c^2-b^2=a^2$ or $c^2-a^2=b^2$. The only structural change required would be to place an idler gear between the pinion 51 and the differential gear 64 (Figure 7) so that the differential mechanism 63, 64 would subtract instead of add. The indicator 79 would now show the length of the third side.

The machine, however, can be utilized without any structural changes to obtain the value of an unknown leg when the hypotenuse and one leg are known. This can be done by entering the value of the known leg through either the input knob 4 or the input knob 5. The other knob can then be rotated so as to bring the indicators 79 and 86 to the value of the hypotenuse. The dials associated with this last named input knob will give you a direct reading of the unknown leg.

Figure 18:
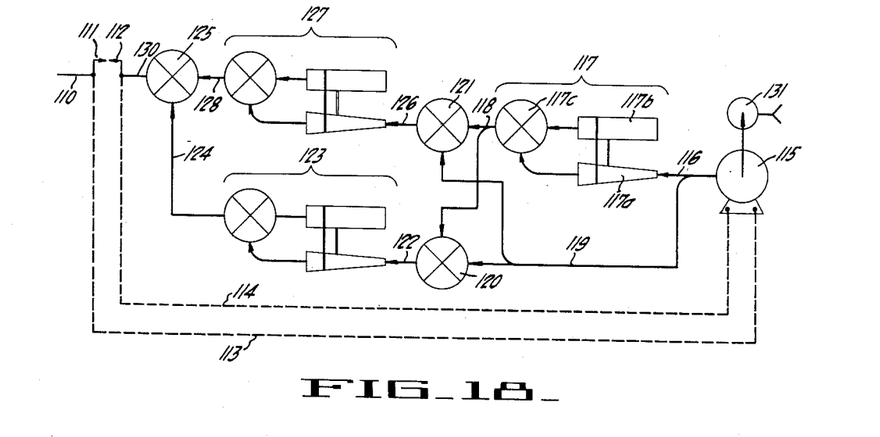
Figure 18 is a diagrammatic illustration of a cube root extracting mechanism embodying the present invention.

In Figure 18 of the drawing, there is diagrammatically illustrated the manner in which the invention is embodied in mechanism for extracting the cube root of an input quantity. In this embodiment, the input shaft 110 is rotated an amount proportionate to the value of the quantity of the cube root of which is to be extracted. This acts to separate a pair of contacts 111, 112 corresponding to the contacts 72 and 96 of the triangle solving mechanism just described; the contact 111 being secured to the shaft 110 so as to be moved away from the contact 112 by rotation of the shaft. The contacts 111, 112 control the circuit 113, 114 of a servomotor 115 the shaft 116 of which drives a cone and cylinder squaring mechanism 117 which includes the cone 117a, the cylinder 117b, and the differential mechanism 117c. The output shaft 118 of this squaring mechanism 117 will therefore be rotated in amount proportionate to the square of the quantity by which the input shaft 116 is rotated by the motor 115.

The shaft 116 of motor 115 also acts through shaft 119 to drive one input leg of each of two differentials 120 and 121, a second input leg of which differentials being driven by the output shaft 118 of the squaring mechanism 117. The inputs of the differentials 120 and 121 are arranged so that the differential 120 adds to the output of the squaring mechanism 117 a quantity equal to the input fed thereinto by the shaft 119, while the differential 121 subtracts from the output of the squaring mechanism 117 a quantity equal to the input transmitted by shaft 119.

The output of the differential 120 is fed by shaft 122 through a second squaring mechanism 123 of the same general type as the squaring mechanism 117, and the output of the squaring mechanism 123 is fed by shaft 124 into one input leg of a differential 125. Similarly, the output of the differential 121 is fed by a shaft 126 through a third squaring mechanism 127 of the same type as the squaring mechanism 117 and the output of the squaring mechanism 127 is fed by shaft 128 into another input leg of the differential 125. The inputs from shafts 124 and 128 into the differential 125 are directionally related so that the output of the squaring mechanism 123 is subtracted from the output of the squaring mechanism 127, the result being that the output of the differential 125 is equal to the cube of the quantity represented by the rotation of the shaft 116 of motor 115. The output of differential 125 rotates a shaft 130 which carries the other of the two previously mentioned contacts 111, 112 acting to move the contact 112 into engagement with the contact 111, which as previously mentioned was positioned in accordance with the input quantity of which the cube root was desired. When contact 112 moves into contact with the complementary contact 111, the motor 115 is arrested just as in the case of the previously described triangle solving mechanism, and at this stage it will be observed that the shaft 116 of the motor 115 has been rotated an amount proportionate to the cube root of the quantity represented by the rotation of the input shaft 110. The result of the computation may be conveniently indicated by an indicating device 131 attached to an opposite end of the shaft 116.

Figure 19:
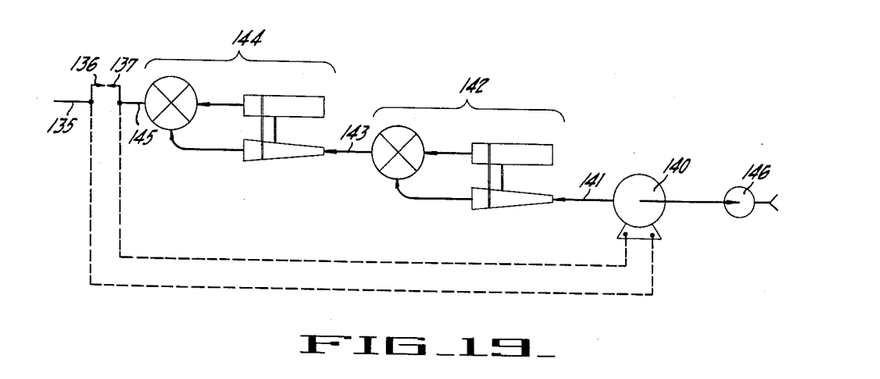
Figure 19 is a diagrammatic illustration of a fourth root extracting mechanism embodying the present invention.

In Figure 19 of the accompanying drawing, there is diagrammatically illustrated an embodiment of the present invention adapted for the extraction of the fourth root of an input quantity.

This arrangement is generally similar to that illustrated in Figure 18, although mechanically somewhat simpler; the input quantity the fourth root of which is desired being entered by rotation of the shaft 135 an amount proportionate to the value of the quantity. By separation of the contact 136 from the contact 137, the rotation of the input shaft 135 causes rotation of the shaft of the servomotor 140, the shaft 141 of which drives a squaring mechanism 142 so that the output shaft 143 of the squaring mechanism is rotated an amount proportionate to the square of the quantity represented by the rotation of the shaft 141. The ouput shaft 143 of the squaring mechanism 142 in turn drives the input of a second squaring mechanism 144 the output shaft of which 145 is thus rotated an amount proportionate to the square of the quantity represented by the rotation of the output shaft 143 of the first squaring mechanism 142 and thus by the fourth power of the quantity represented by the rotation of the shaft 141 of the motor 140. The contact 137 is moved by the shaft 145 and brought into engagement with the shaft 136 when the shaft 141 of the motor 140 has rotated an amount equal to the fourth root of the quantity represented by the rotation of the input shaft 135, and such a fourth root may be conveniently indicated by an indicating device 146 rotated by the opposite end of the shaft 141.

Figure 20:
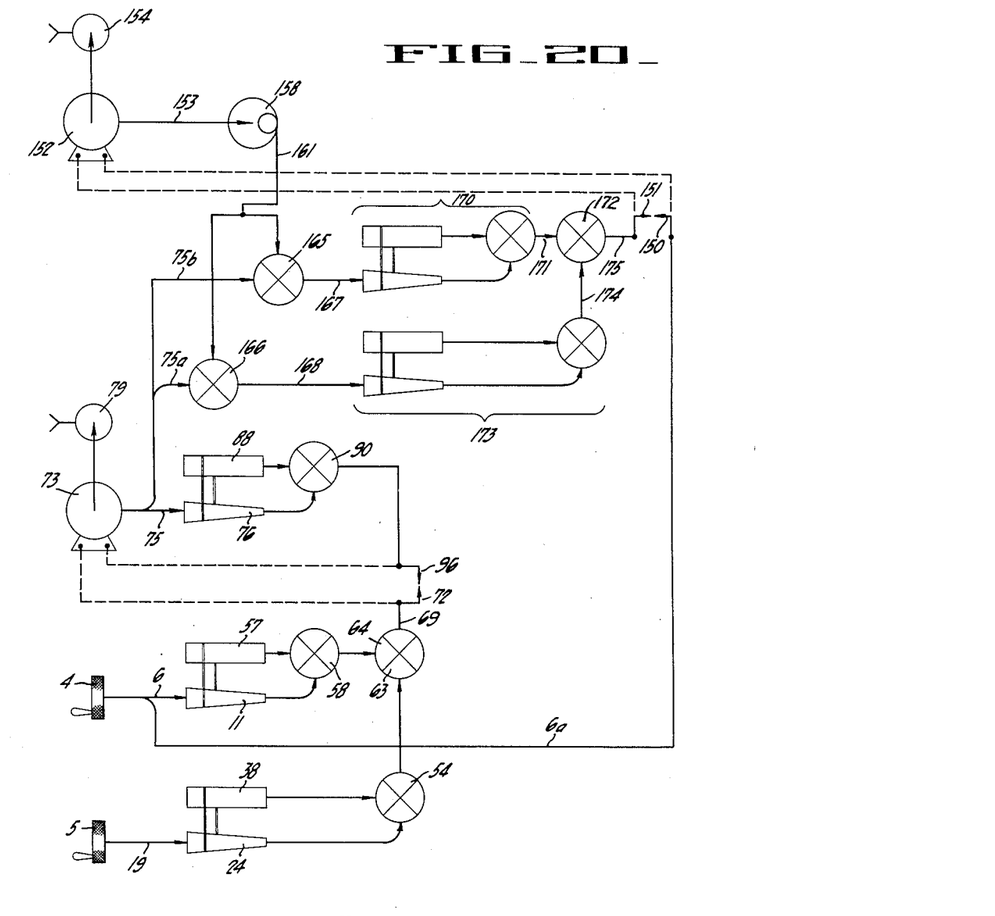
Figure 20 is a diagrammatic illustration of a triangle solving mechanism employing two matching arrangements according to the present invention to solve for an unknown angle and for the hypotenuse simultaneously.

In Figure 20 there is illustrated diagrammatically an arrangement whereby the present invention is utilized by employing a plurality of servo-motor balancing arrangements to simultaneously solve a series of equations, the second equation in the series utilizing as an input quantity the quantity found by the solution of the first equation in the series.

The first equation solved by the arrangement illustrated in Figure 20 is that solved by the triangle solving mechanism first described in this specification, i. e., $c=\sqrt{a^2+b^2}$.

The arrangement for solving this equation is diagrammatically illustrated in this figure of the drawing with the same reference numerals applied to the elements as were applied to the parts shown in full in Figures 1 to 16, inclusive, of the accompanying drawing. The input corresponding to the altitude of the triangle is entered by rotation of the shaft 6 by means of knob 4, while the input corresponding to the base of the triangle is entered by rotation of shaft 19 by knob 5. These quantities are squared by the cone and cylinder squaring mechanism comprising cone 11 and cylinder 57 in the case of the first input and cone 24 and cylinder 38 in the case of the second input. The outputs of the differentials associated with the respective squaring mechanisms are transmitted by gears 58 and 54, respectively, to a differential the inputs of which are gears 64 and 63, respectively, so that the squares are added together and the sum of the squares is fed out through the output shaft 69 which adjusts the electrical contact 72. Separation of the contact 72 from the contact 96 effected by displacement of the output shaft 69 in this manner causes rotation of the shaft of the servo-motor 73 in an amount proportionate to the square root of the sum of the squares of the altitude and the base of the triangle: the rotation of the shaft of the servo-motor, which feeds in power from the root side, being squared by the cone and cylinder mechanism comprising the cone 76 and the cylinder 88 and the c-squared values fed back by gear 90 to the electrical contact 96 for comparison with the $a^2+b^2$ values, all as previously described.

In order to simultaneously solve for the value of the angle included between the hypotenuse and the base of the triangle, a contact 150 is simultaneously displaced by the rotation of the altitude setting knob 4 transmitted through shaft 6a as shown in Figure 20. Separation of the contact 150 from its cooperating contact 151 causes operation of a second servo-motor 152 rotating the shaft 153 of the motor 152 by an amount which, as hereinafter explained, will be proportionate to the angular value of the angle included between the hypotenuse of the triangle and the base thereof, which angular value may be conveniently indicated on an indicator 154.

Figure 21:
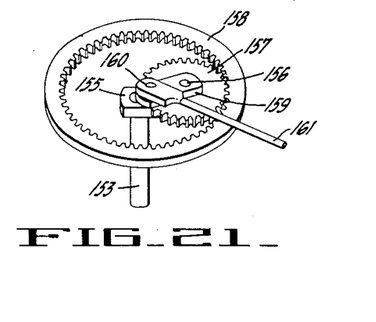
Figure 21 is a detail view, in perspective, of a sine converter utilized in the arrangement of Figure 20.

The angular value represented by the rotation of shaft 153 is converted into a value proportionate to the sine of the angle by mechanism shown in detail in Figure 21, which comprises a crank arm 155 secured to the shaft 153 and having rotatably mounted thereon at 156 a gear 157 meshing with a fixed ring gear 158. Fixed to the gear 157 is a plate 159 having pivotably connected thereto at 160 an output rod 161, the arrangement being such that the output rod 161 will have imparted to it an axial movement proportionate to the value of the sine of the angle represented by the rotation of the shaft 153.

The axial movement of the rod 161 which is proportionate to the sine of the angle included between the hypotenuse and the base of the triangle is converted into proportionate rotational movement and fed additively, as an input, into one input leg of a differential 165 on the one hand, and subtractively as an input into one input leg of a second differential 166. Simultaneously both the differential 165 and the differential 166 receive as second inputs a movement proportionate to the value of the hypotenuse of the triangle, this movement being fed from the output shaft of the servo-motor 73 by shafts 75a and 75b. The output 167 of the differential 165 is thus proportionate to the value of the hypotenuse plus the sine of the angle included between the hypotenuse and the base while the output 168 of the differential 166 is proportionate to the value of the hypotenuse minus the sine of the angle included between the hypotenuse and the base.

The output value represented by the rotation of the shaft 167 is squared by a cone and cylinder squaring mechanism 170 and transmitted by the output shaft 171 of said squaring mechanism to a differential 172, while the output value represented by the rotation of the shaft 168 is squared by a squaring mechanism 173 the output of which is transmitted by shaft 174 as a second input to the differential 172. The relation of the inputs 171 and 174 of the differential 172 is such that the quantities represented by the two inputs are subtracted from each other, and the output 175 of the differential 172 is thus proportionate to the value of the hypotenuse of the triangle multiplied by the sine of the angle included between the hypotenuse and the base thereof; being thus proportional also to the value of the altitude of the triangle.

The previously mentioned contact 151 is positioned in accordance with the angular position of the output shaft 175 of the differential 172, and thus when the value represented by the output shaft 175 is equal to the value of the altitude of the triangle in accordance with which the companion contact 150 is positioned by the shaft 6a, movement of the shaft 153 by the servo-motor 152 will cease and under these circumstances the angular positioning of the shaft 153 will be proportionate to the value of the angle included between the hypotenuse of the triangle and its base.

The arrangement thus provides a convenient means for simultaneously solving for the hypotenuse of a right triangle and the value of the angle included between the hypotenuse and the base given the value of the base and the altitude of the triangle.

Figure 22:
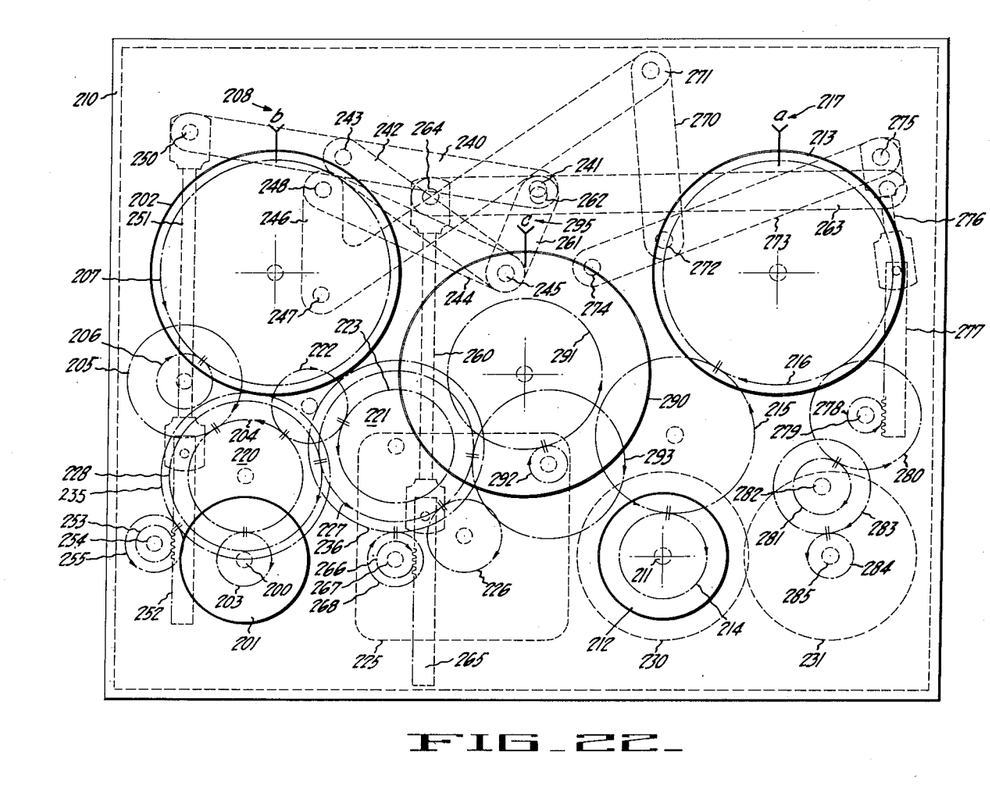
Figure 22 is a partly diagrammatic illustration of a linkage type triangle solving mechanism embodying the present invention.

Although the present invention has been described in the preceding embodiments as applied to computing mechanisms utilizing cone and cylinder squaring mechanisms, it is of general utility in connection with other types of computing mechanisms, as illustrated in Figure 22 of the accompanying drawings in which the invention is shown applied to a triangle solving mechanism employing a conventional linkage type of multiplying mechanism.

In the embodiment of the invention illustrated in Figure 22, means are provided for determining the length of the hypotenuse of a right triangle when the values of the base and the altitude are known. For mechanical convenience, the conventional mathematical formula $$c^2 = a^2 + b^2$$

is transposed into the form $a^2 = (c+b)(c-b)$.

Here $c$ is the hypotenuse; $a$ is the altitude; and $b$ is the base of the triangle.

Referring specifically to Figure 22, the value equal to the length of the base of the right triangle to be solved is fed into the instrument by rotation of a shaft 200, which may for convenience have a hand knob 201 attached thereto, although if the input value is to be entered otherwise than manually, as from another computing mechanism or distance determining mechanism, the manual setting knob 201, may, of course, be omitted. Preferably, but not essentially, this value is also indicated on a dial 202 connected to the shaft 200 by gears 203, 204, 205, 206, and 207, said dial being movable with respect to fixed indicia 208 on a frame 210 in which all of the parts herein described are mounted.

The value equal to the altitude of the triangle is fed into the instrument by rotation of a shaft 211 which likewise may have attached thereto for convenience a hand knob 212 and similarly may be connected to a dial 213 by gears 214, 215, and 216, said dial being movable with respect to indicia 217 on the frame 210 and being calibrated, as shown, so that the actual rotation of the shaft 211 will be proportionate to the square of the value representing the altitude of the triangle, while the values inscribed on the dial 213 will give a direct reading of the altitude value itself.

The computation of the valve $(c+b)$ and the value $(c-b)$ is accomplished by two conventional differential gear mechanisms 220 and 221, the previously mentioned gear 204 constituting an input gear of the differential 220 whereby the base value is entered negatively into that differential mechanism. The gear 204 is connected by an idler gear 222 with an input gear 223 of the second differential mechanism 221 so that the base value is simultaneously entered positively into the differential 221.

The value of the hypotenuse of the triangle is determined by matching against the square of the value of the altitude, entered as previously described by rotation of shaft 211, the product of the multiplication $(c+b)(c-b)$ and for this purpose a servo-motor is utilized to feed into both of the differentials 220 and 221 a positive quantity equal to the calculated value of the hypotenuse. For this purpose the servo-motor 225 is connected by a gear 226 with a second input gear 227 of the differential 221 which gear 227 meshes directly with a second input gear 228 of the differential 220.

The servo-motor 225 is controlled by a conventional system comprising a generator 230 directly actuated by rotation of the altitude input shaft 211 and a control transformer 231 actuated by the product registering element of the multiplying mechanism as hereinafter described, the arrangement being such that rotation of the altitude input shaft 211 by displacing the control element of the generator 230 causes the servo-motor 225 to commence operation, which operation continues until the displaceable element of the control transformer 231 has been displaced by the product registering element of the multiplying mechanism an amount equal to the initial displacement of the altitude input shaft 211. Servo-motor controls of this general character are well known in the art and therefore are not described in detail herein.

Operation of the servo-motor 225 initiated by displacement of the altitude input shaft 211, as above described, therefore causes rotation of the output gear 235 of the differential 220 by an amount equal to $(c-b)$ and of the output gear 236 of the differential 221 by an amount equal to $(c+b)$. These output values of the differentials 220 and 221 are then multiplied by a conventional linkage form of multiplying mechanism to give a product equal to the value of $a^2$ as set forth in the above formula.

The multiplying linkage embodied in the instrument disclosed in Figure 22 is of the general type disclosed in Imm Patent No. 2,394,180, dated February 5, 1946, being particularly described at page 4, column 2, beginning at line 62 therein. In the instrument shown in Figure 22, this mechanism is illustrated as comprising an element 240 pivotally mounted on the frame 210 at 241, a movable link 242 pivotally connected to the element 240 at 243, a second link 244 having a pivotal connection with the link 242 at 245, and a product registering element 246 pivotally mounted on the frame at 247 and having a pivotal connection with the link 244 at 248; the spacings between the pivotal connections 241 and 243, 243 and 245, and 245 and 248, all being equal.

The element 240 of this multiplier linkage is pivotally connected at 250 to a rod 251 actuated by a rack 252 meshing with a pinion 253 mounted on a shaft 254 on which there is also mounted a pinion 255 meshing with the output gear 235 of the differential 220, this arrangement being such that the element 240 of the multiplier linkage will be displaced an amount proportional to the rotation of the output of the differential 220 which is equal to the value $(c-b)$.

The pivotal connection 245 of the multiplier linkage just described is connected to a rod 260 by means of a link 261 pivotally connected to the multiplier linkage at 245 and pivotally connected at its opposite end at 262 to a lever 263 which in turn is pivotally connected at 264 to the rod 260. The rod 260 is in turn connected to a rack 265 meshing with the pinion 266 mounted on the shaft 267 on which there is also mounted a pinion 268 meshing with the output gear 236 of the differential 221, this arrangement being such that the pivotal connection 245 of the multiplier linkage is displaced by an amount proportionate to the rotation of the output gear 236 of the differential 221 or by an amount equal to $(c+b)$.

The structure of the multiplying linkage above described is such that, as particularly described in the above mentioned Imm Patent No. 2,394,180, the product registering element 246 will be displaced about its pivot 247 by an amount equal to the product of the displacement of the pivotal connections 243 and 245, and the movement of the product registering element 246 will thus be equal to the product of the expression $(c+b)(c-b)$ or equal to the square of the value of the altitude of the triangle.

Displacement of the product registering element 246 is therefore used to control the stopping of the operation of the servo-motor 225 initiated by displacement of the displaceable element of the generator 230 by rotation of the shaft 211 as an incident to the entry of the altitude value. The connection between the multiplier linkage product registering element 246 and the control transformer 231 which accomplishes this purpose comprises a link 270 pivotally connected to the output element 246 at 271 and at its lower end pivotally connected at 272 to a lever 273 pivotally mounted on the frame of the instrument at 274. The lever 273 is pivotally connected at its opposite end at 275 to a rod 276 having at its lower end a rack 277 meshing with the pinion 278 mounted on a shaft 279 upon which there is also mounted a pinion 280 meshing with a further pinion 281 mounted on a shaft 282 upon which there is also mounted a pinion 283 meshing with a pinion 284 mounted on the shaft 285 of the control transformer 231; this arrangement being such that when the shaft 285 is rotated by the arm 246 of the multiplier linkage, an amount equal to the initial rotation of the shaft 211 by the input handle 212, operation of the servo-motor will be arrested, since at this stage of the operation of the servo-motor a hypotenuse value has been entered which will balance the formula $a^2=(c+b)(c-b)$. The arresting of the servo-motor thus takes place at a point when the rotation of the servo-motor shaft has correctly registered the value of the hypotenuse, and this value may be conveniently registered or indicated on a scale 290 connected to the servo-motor shaft by gears 291, 292, 293, 227 and 226, said scale being movable with respect to indicia 295 carried by the frame 210.

It is particularly evident in contemplating this embodiment of the invention that if an attempt were made to displace the pivotal connection 245 of the multiplier linkage by the application of force to the pivotal connections 243 and 248, respectively, and thus to register the value of the hypotenuse by a displacement of the pivotal connection 245 effected in such a manner, the force required to be exerted would increase to infinity as the pivotal connection 245 approached coaxial alignment with the pivotal mounting 241. It would thus be a mechanical impossibility to move the pivotal connection 245 into axial alignment with the pivotal mounting 241 in this manner. However, according to the present invention, the movement of the pivotal connection 245 into alignment with the pivotal mounting 241 to register a zero value for the hypotenuse of the triangle being accomplished by the servo-motor acting through gears 226, differential 221, gears 268 and 266, rack 265, lever 263, and link 261 is accomplished with the utmost facility.

The same considerations apply in the other embodiments of the invention herein described, and it is thus seen that the present invention fully accomplishes the objects hereinabove set forth.

The servo-motor and controls therefor illustrated and described in connection with Figure 17 of the drawings, and the servo-motor and controls therefor illustrated and described in connection with Figure 22 of the drawings are merely examples of well known types of such mechanisms, and either type can be used in place of the other in a manner which will be obvious to those familiar with such devices.

Reference is made to the article entitled "Selsyn Design and Application" by T. C. Johnson, published in Electrical Engineering Transactions for October, 1945, Volume 64, pages 703 to 708 inclusive for descriptions of a variety of mechanisms of the type in question including one of the type referred to in connection with Figure 22 of the present specification, and it will be evident that this generator-and-transformer control could be substituted for the contact control of Figure 17 merely by utilizing the means for displacing the contact 72 to displace the generator, and utilizing the means for displacing the contact 86 to displace the transformer.

Figure 17:
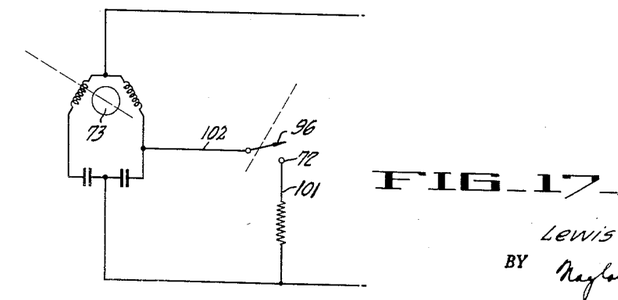
Figure 17 is a circuit diagram of the control circuit of the motor 73.

The servo-motor 73 of Figure 17 has windings which are unbalanced, so that the shunting of one of the two condensers by closure of the contacts 72-86 causes reversal of the motor, while the opening of the contacts causes it to run in its normal direction. It will be evident that this type of motor and control could be substituted for the generator-and-transformer type of motor and control merely by utilizing the means for displacing the generator to displace the contact 72, and utilizing the means for displacing the transformer to displace the contact 86.

This application is a continuation-in-part of my application, Serial No. 508,233, filed October 29, 1943, for a Triangle Solving Mechanism.

What I claim is:

1. In a computing mechanism of the class described, the combination of a first member adapted to be differentially adjusted over a range of positions representative of a series of values which are to be computed, output means differentially adjustable over a range of positions representative of a series of values, power-operated driving means for effecting differential adjustment of said output means, proportional movement transmitting mechanism including a first intermediate element and constituting a mechanical connection between said driving means and said first intermediate element, adding means controlled by said driving means and said first intermediate element for registering the sum of the movements thereof, subtracting means controlled by said driving means and said first intermediate element for registering the difference of the movements thereof, a second proportional movement transmitting mechanism including a second intermediate element and constituting a mechanical connection between said adding means and said second intermediate element, a third proportional movement transmitting mechanism including a third intermediate element and constituting a mechanical connection between said subtracting means and said third intermediate element, an additional subtracting means controlled by said second and third intermediate elements for registering the difference of the movements thereof, and means jointly controlled by said first member and said additional subtracting means for initiating operation of said driving means whenever the value represented by said first member is unequal to the value registered by said additional subtracting means and arresting operation of said driving means when said values are equal.

2. In a computing device for effecting the simultaneous solution of a plurality of related equations, the combination of a first equation solving computing mechanism comprising an adjustable factor entering device, adjustable output means, power driving means for adjusting said output means, and means jointly responsive to adjustment of said output means by said driving means and to adjustment of said factor entering device for initiating and arresting adjustment of said output means by said driving means; a second equation solving computing mechanism comprising a second adjustable factor entering device, means controlled by said power driving means for adjusting said second adjustable factor entering device, a second adjustable output means, a second power driving means for adjusting said second output means, and means jointly responsive to adjustment of said second output means by said second driving means; to adjustment of said second factor entering device by said first mentioned power driving means; and to adjustment of said first mentioned factor entering device for initiating and arresting adjustment of said second output means by said second driving means.

3. In a computer, the combination of a differentially adjustable value entering device, a servo-motor control including a pair of differentially adjustable, value-representing, follow-up elements, an operating connection between said value entering device and one of said adjustable elements, mechanical-movement-transmitting computing means having an input member and an output member; said computing means being incapable of being driven throughout its entire range by power applied through said input member, an operating connection between said input member and the other of said adjustable elements, a servo-motor, and operating connection between said servo-motor and said output member, through which output member said computing means may be driven throughout its entire range, means jointly controlled by said adjustable elements for initiating operation of said servo-motor whenever the values represented by the respective positions of said follow-up elements are unequal and arresting such operation when said values are equal, and result registering means driven by said servo-motor.

4. A computer according to claim 3 in which said mechanical-movement-transmitting computing means comprises a multiplying mechanism.

5. A computer according to claim 3 in which said mechanical-movement-transmitting computing means comprises a cone and cylinder having flexible driving means interconnecting them.

6. In an equation solving computer, the combination of a plurality of differentially adjustable value entering devices each adapted to be differentially adjusted to represent a known factor of an equation, a servo-motor control including a pair of differentially adjustable, value-representing, follow-up elements, a computing operating connection between said plurality of value entering devices and one of said adjustable elements, mechanical-movement-transmitting computing means having an input member and an output member; said computing means being incapable of being driven throughout its entire range by power applied through said input member, an operating connection between said input member and the other of said adjustable elements, a servo-motor, an operating connection between said servo-motor and said output member, through which output member said computing means may be driven throughout its entire range, means jointly controlled by said adjustable elements for initiating operation of said servo-motor whenever the values represented by the respective positions of said follow-up elements are unequal and arresting such operation when said values are equal, and result registering means driven by said servo-motor.

7. In a computer for solving a right triangle, a first, differentially adjustable, value entering device adapted to be differentially adjusted to represent the value of one known side of a right triangle, means controlled by said device for squaring a value entered thereby, a second, differentially adjustable, value entering device adapted to be differentially adjusted to represent the value of another known side of a right triangle, means controlled by said second device for squaring a value entered thereby, adding means controlled by said two squaring means and including an output element differentially positioned in accordance with the sum of the squares of the values entered by said value entering devices, a servo-motor control including a pair of differentially adjustable, value-representing, follow-up elements, an operating connection between said output element and one of said follow-up elements, mechanical-movement-transmitting square root extracting means having an input member and an output member; said extracting means being incapable of being driven throughout its entire range by power applied through said input member, an operating connection between said input member and the other of said follow-up elements, a servo-motor, an operating connection between said servo-motor and said output member through which output member said extracting means may be driven throughout its entire range, means jointly controlled by said adjustable elements for initiating operation of said servo-motor whenever the values represented by the respective positions of said follow-up elements are unequal and arresting such operation when said values are equal, and result registering means driven by said servo-motor.

8. A computer for solving a right triangle according to claim 7 in which said mechanical-movement-transmitting square root extracting means comprises a cone and cylinder having a flexible driving means interconnecting them.

LEWIS W. IMM.

(References on following page)

References Cited in the file of this patent

UNITED STATES PATENTS

| Number | Name | Date |
|---|---|---|
| 1,292,085 | Schantz | Jan. 21, 1919 |
| 1,529,817 | Turner | Mar. 17, 1925 |
| 2,040,918 | Bristol | May 19, 1936 |
| 2,194,477 | Maxson et al. | Mar. 26, 1940 |
| 2,349,118 | Simpson | May 16, 1944 |
| 2,401,447 | Wipff | June 4, 1946 |
| 2,438,112 | Darlington | Mar. 23, 1948 |
| 2,460,638 | Gilbert | Feb. 1, 1949 |
| 2,472,129 | Streeter | June 7, 1949 |
| 2,505,258 | Robinette | Apr. 25, 1950 |

FOREIGN PATENTS

| Number | Country | Date |
|---|---|---|
| 284,804 | Great Britain | Feb. 9, 1928 |